United States Patent
Turrini

(10) Patent No.: US 7,355,727 B2
(45) Date of Patent: Apr. 8, 2008

(54) METHOD AND SYSTEM FOR CHECKING THE POSITION OF A MECHANICAL PART WITH A LIGHT BEAM

(75) Inventor: Andrea Turrini, Bologna (IT)

(73) Assignee: Marposs Societa' per Azioni, Bentivoglio (BO) (IT)

(*) Notice: Subject to any disclaimer, the term of this patent is extended or adjusted under 35 U.S.C. 154(b) by 234 days.

(21) Appl. No.: 10/567,831

(22) PCT Filed: Sep. 13, 2004

(86) PCT No.: PCT/EP2004/010202

§ 371 (c)(1),
(2), (4) Date: Feb. 10, 2006

(87) PCT Pub. No.: WO2005/025803

PCT Pub. Date: Mar. 24, 2005

(65) Prior Publication Data

US 2006/0232791 A1    Oct. 19, 2006

(30) Foreign Application Priority Data

Sep. 16, 2003   (IT) .......................... BO2003A0536

(51) Int. Cl.
*G01B 11/14* (2006.01)

(52) U.S. Cl. ................................................. 356/615

(58) Field of Classification Search ................. 356/615
See application file for complete search history.

(56) References Cited

U.S. PATENT DOCUMENTS

| 3,749,500 A | | 7/1973 | Carlson et al. |
| 4,276,480 A | * | 6/1981 | Watson ............... 250/559.1 |
| 5,255,199 A | | 10/1993 | Barkman et al. |

FOREIGN PATENT DOCUMENTS

DE           195 28 376         2/1997

* cited by examiner

*Primary Examiner*—Roy M Punnoose
(74) *Attorney, Agent, or Firm*—Dickstein Shapiro LLP

(57) ABSTRACT

A method and a system for checking the position of a mechanical part (2), for example a tool of a lathe, along a checking direction (X), employs an optoelectronic device (1) with a laser beam (7) and a sensor (8) for detecting the interruption of the beam. Mutual displacements between the part to be checked and the optoelectronic device within a checking area (13) are controlled according to a sequence including linear inspection movements (30) along a direction (Z) perpendicular to the checking direction and at inspection positions (Pi;P1-P4). The inspection positions are spaced apart along the checking direction at progressively decreasing mutual distances (D), according to a sequence that converges to the searched position (PN).

13 Claims, 3 Drawing Sheets

METHOD AND SYSTEM FOR CHECKING THE POSITION OF A MECHANICAL PART WITH A LIGHT BEAM

TECHNICAL FIELD

The present invention relates to a method for checking the position of a mechanical part along at least one checking direction by means of an apparatus including a device for generating a light beam along a trajectory transversal to the checking direction, a sensor for detecting the interruption of the light beam, and devices for causing mutual displacements between the mechanical part and the light beam along the checking direction and along an inspection direction transversal to the checking direction. This invention also relates to a system for checking the position of a tool coupled to the turret of a machine tool.

BACKGROUND ART

Apparatuses for automatically checking the position or the integrity of tools are often utilized in machine tools of various types as, for example, numeric control machining centers where the condition of the tools can be checked in the course of the actual machining phase when the tool is coupled to the rotating spindle.

Known apparatuses and methods perform checkings of this type, i.e. determine the presence, the position, the dimensions and possible breakages of tools, by utilizing feelers for contacting the tools, or contactless systems as, for example, optical systems that employ light rays or beams.

U.S. Pat. No. 3,912,925 discloses a drilling machine in which devices for checking the integrity of the tools utilize transversal light beams with limited thickness. The beams are substantially coplanar to the feed direction of the tools. The non-interruption of a light beam at a specific position of the tool is detected and notifies an anomalous condition of the tool.

Different applications of optical or optoelectronic systems for checking the position and/or the dimensions of non-rotating tools with profile not a priori precisely known present specific problems. This is the case, for example, when checking tools located in the tool-holder ("turret") of a lathe and it is required to accurately check the position of the cutting edge of these tools.

A specific problem rises whenever expensive and delicate devices with thick linear sensors that employ an equally thick light beam enabling to detect and to analyze the entire profile of the tool (for example "shadow-casting" systems) cannot be used and it is desired to utilize apparatuses in which there is simply detected the interruption of a light beam (for example a laser beam) with limited thickness. The posed problem is to find the correct arrangement between tool and light beam that enables the former to interfere with the latter at the significative dimension to be checked, since the position of the significative dimension along the entire profile of the tool is not a priori known.

A solution proposed, for example, in U.S. Pat. No. 3,749, 500 (FIG. 17, column 16, lines 4-21) is to arrange the optoelectronic apparatus in such a way that the beam lies in the plane that includes the profile of the tool to be checked, substantially perpendicular to the direction of the dimension to be checked. In many cases this possible solution is not applicable by reasons of insufficient room available. Moreover such solution is not really flexible because it does not enable to carry out checkings of different tools—for example, tools mounted in different positions on the same turret—the significative profile of which, i.e. the profile that includes the cutting edge to be checked, lies in different planes. Therefore, it is necessary to add complexity to the system by foreseeing the possibility of displacing the beam perpendicularly to the planes of the profiles or vice versa and to identify the correct position by performing an additional scan in said direction.

Furthermore, the checkings that the solution disclosed in U.S. Pat. No. 3,749,500 enables to perform are limited to a single direction along the significative profile plane, i.e. perpendicular to the light beam. This means the preclusion, unless arranging a plurality of light beams in other ways, to checkings of tools with cutting edges that include—as often occurs—conceptually punctiform working areas with different orientations along the significative profile plane.

Therefore, it is preferred to resort to a different arrangement of the optoelectronic apparatus, in which the light beam lies in a transversal direction (more particularly, a perpendicular direction) to the plane of the tool profile.

FIG. 1 schematically shows a cross-section view along plane X-Z of a mechanical part U that includes an end point C, along direction X, the position thereof is to be checked along the same direction X (checking direction). FIG. 1 also shows the cross-section view along the same plane X-Z of a light beam R arranged along a direction Y perpendicular to the plane X-Z. The mechanical part U schematically represents, for example, a tool mounted in the turret of a lathe and including, in a position along the plane X-Z not a priori known, a cutting edge C the position of which along the direction X is to be located.

A method of performing the checking foresees identifying the trend of the profile B—not a priori known—of the part U along the cross-section plane, by a point scan of the profile. If the tool to be checked is located in the turret of a lathe, the scan is performed, for example, by displacing the turret along directions X and Z according to sequences of a known type, by detecting interruptions of the light beam R at a plurality of points of the profile B, and by performing processings, also of a known type, including, for example, interpolations for locating points of the profile B not "contacted" by the beam R.

This known method may pose reliability problems bound to the selected scan interval, type of scan (greater or lesser number of points to be checked and consequent longer or shorter involved time) and consequent necessary processings. In fact, an inaccurate or incomplete detection of the profile may cause—in the formerly mentioned example—the missed identification of the point C of maximum projection in the direction X, the position of which has to be checked.

In any case, the known method is time consuming and involves complex processings.

DISCLOSURE OF THE INVENTION

An object of the present invention is to provide a method and a system for checking the position of a tool, more specifically the cutting edge of a tool the profile of which is not known a priori, that is simple and reliable, overcoming the disadvantages that the known methods and systems present.

This and other objects and advantages are achieved by methods and systems described below and recited in the appended claims.

Among the advantages that the method according to the present invention and the associated system provide, there are the remarkable rapidity of the feasible checkings and the possibility of identifying—by means of the same apparatus and in an extremely simple and rapid way—the position of working areas of the tool, i.e. the points of the cutting edge oriented for performing machinings along different directions.

BRIEF DESCRIPTION OF THE DRAWINGS

The invention will now be described with reference to the enclosed sheets of drawings, given by way of non limiting example only, wherein.

BEST MODE FOR CARRYING OUT THE INVENTION

Figure 1:
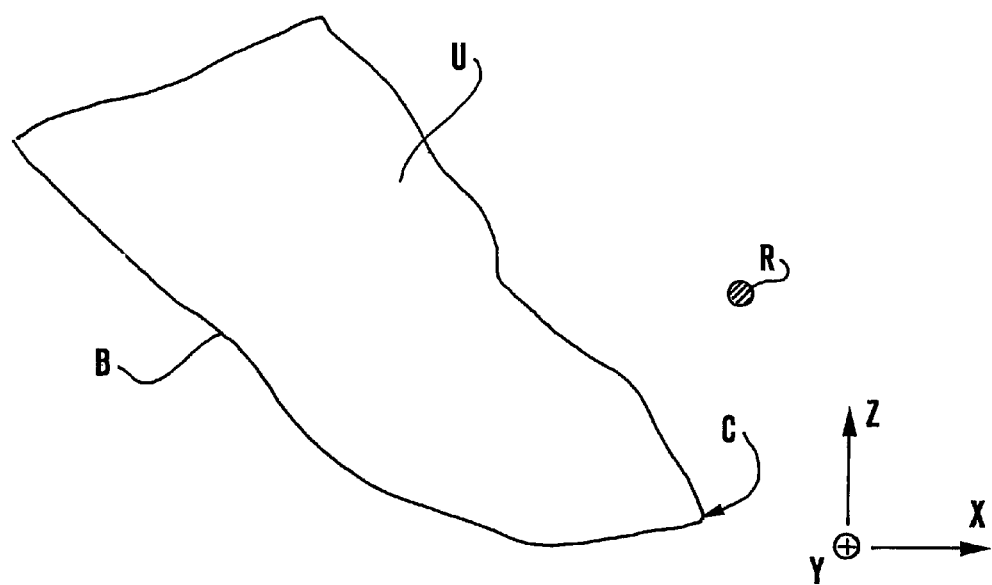
FIG. 1 is a schematic and partial representation of a mechanical part to be checked by means of a method according to the invention.
Figure 2:
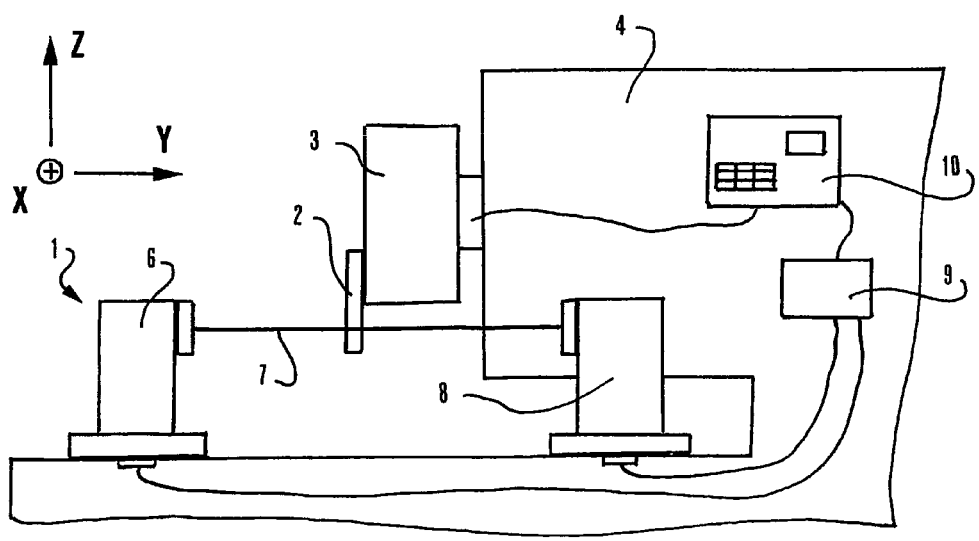
FIG. 2 shows in simplified form an application on a machine tool that implements a system according to the invention.

FIG. 2 illustrates, in an extremely schematic form, a checking system including an optoelectronic apparatus 1 in the course of checking a mechanical part 2, more specifically a tool located in a turret 3 of a lathe 4 to which the apparatus 1 is coupled. Typically, the turret 3 carries other tools, not shown in the schematic representation of FIG. 1. The apparatus 1 includes an emitter 6, i.e. a device for generating a light beam 7, for example a laser beam, along a transversal trajectory substantially parallel to direction Y, and a receiver 8, i.e. a sensor, arranged along said trajectory, that detects the correct reception of the light beam 7 or the non-reception of light owing to the interruption of the beam 7. A processing unit 9 is electrically connected to the emitter 6 and to the receiver 8. The system includes a control unit 10, connected to the processing unit 9, for controlling in a known way, by means of suitable activation devices also known and not illustrated in the figure, the machining movements of the lathe 4 in plane X-Z of the turret 3 that carries the tool 2. For the sake of simplicity and for the reason it is beyond the object of the present invention, a spindle of a known type holding a piece to be checked arranged, for example, in the direction Y, is not illustrated.

Figure 3:
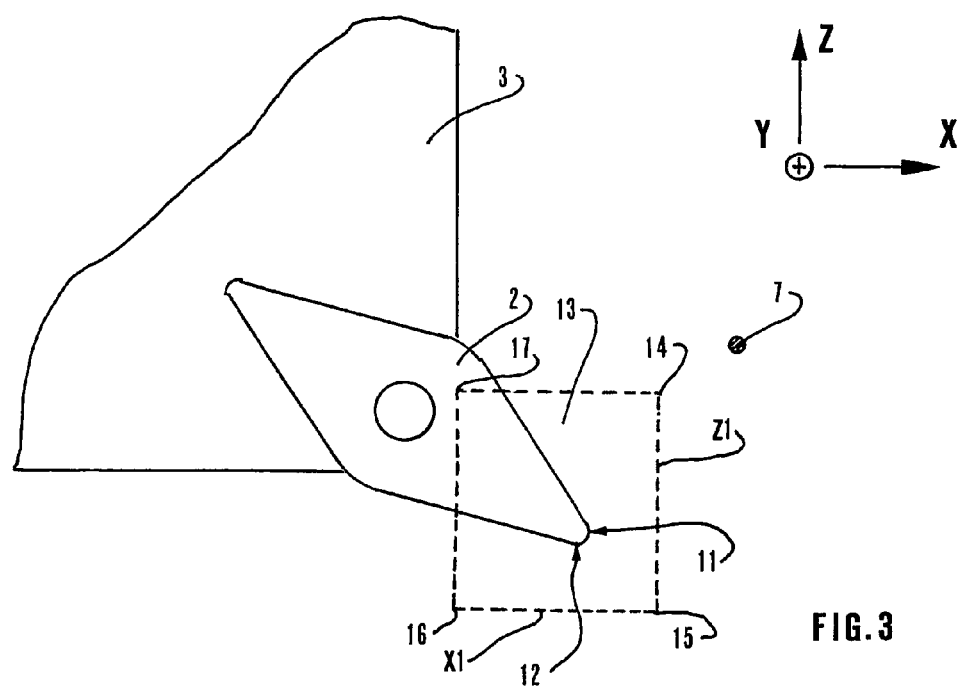
FIG. 3 is an enlarged and partial view of a tool of the machine tool of FIG. 2, along direction Y in FIG. 2.

The surface contour or profile of the tool 2 in the plane X-Z is shown enlarged in FIG. 3, where a checking area 13 of the position of the tool 2 is delimited by a first linear interval X1 and by a second linear interval Z1. The first linear interval X1 and the second linear interval Z1 along the checking direction X and an inspection direction Z, respectively, are defined on the basis of the approximately known nominal dimensions of the tool 2 and delimit the mutual positions that tool 2 and light beam 7 can take in the course of the checking, as hereinafter described. The correct arrangement and dimensions of the area 13 are defined in an initial phase of the checking cycle, as hereinafter also described.

Figure 4:
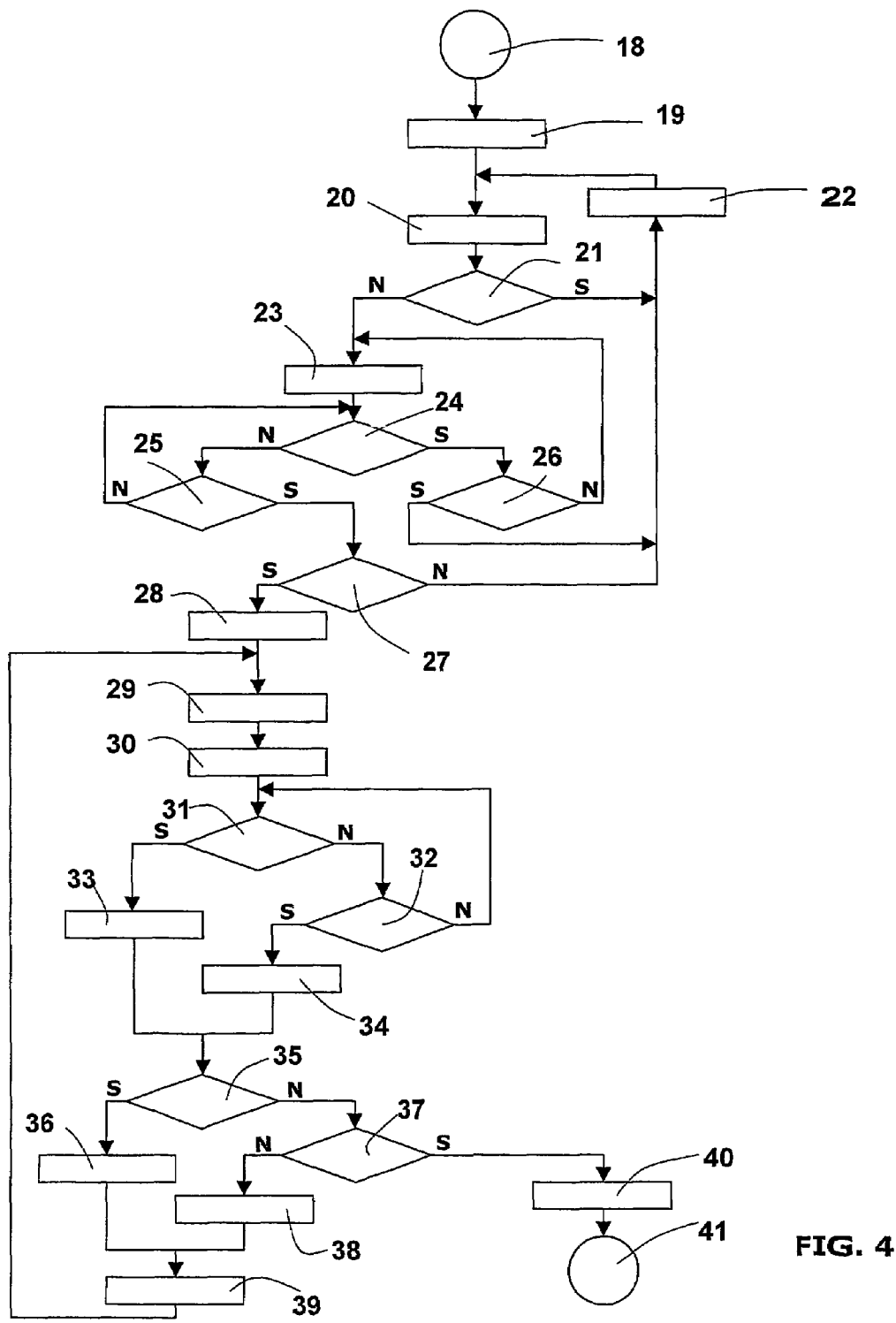
FIG. 4 is a diagram with blocks that represent the various steps of a method according to the invention.

The blocks of the diagram of FIG. 4 refer to a procedure for checking the position of a working area 11 of the tool 2 along the direction X. In an entirely analogous and symmetrical way—not hereinafter described—the checking of the position of a working area 12 of the tool 2 along the direction Z is implemented. The various steps of the procedure and the mutual movements between the tool 2 and the light beam 7 can be checked, for example, by the control unit 10.

The meaning of the blocks represented in FIG. 4 is hereinafter briefly described.

- block 18—start of the checking cycle;
- block 19—acquisition, for example by means of the control unit 10 of the lathe 4, of the data relating to a tolerance value W and to the approximate nominal dimensions of the tool 2, and consequent setting of the checking area 13;
- block 20—displacements between tool 2 and beam 7 for bringing the latter to a first predetermined vertex 14 of the perimeter of the checking area 13;
- block 21—test about interruption or non-interruption of the beam 7 at the vertex 14;
- block 22—modifications of the checking area 13 and of the mutual arrangement tool 2/beam 7;
- block 23—displacements between tool 2 and beam 7 along the perimeter of the checking area 13 starting from a vertex (14,15,16);
- block 24—test in connection with the reaching of the subsequent vertex (15,16,17);
- block 25—test about the interruption of the beam 7;
- blocks 26 and 27—tests for determining whether the in-progress displacement is the last foreseen (between the vertexes 16 and 17);
- block 28—initial setting of procedure parameters, i.e. indicator T0 of the result of the immediately previous checking, indicator V of the sense of the next displacement along the checking direction X, amount D of the next displacement, in addition to the value of a reduction factor FR of the subsequent displacements along the checking direction X;
- block 29—displacement between tool 2 and light beam 7 for bringing the beam 7 to a determined inspection position Pi; this displacement includes a component along the checking direction X of amount D in the sense V;
- block 30—linear inspection movement between tool 2 and beam 7 along the second direction Z in the linear interval Z1;
- block 31—test for determining the completion of the inspection movement in the entire linear interval Z1;
- block 32—test for determining the interruption of the beam 7 in the course of the inspection movement;
- block 33—indication of the non-interruption of the beam 7 in the course of the inspection movement (T=0);
- block 34—indication of the interruption of the beam 7 in the course of the inspection movement (T=1);
- block 35—comparison between the values of the indicators T and T0;
- block 36—confirmation of the sense V of the next displacement along the checking direction X;
- block 37—test for determining the end of a search phase on the basis of a comparison between the tolerance value W and the distance D between recent mutual positions between beam 7 and tool 2 in the direction X;
- block 38—reversal of the sense V of the next displacement along the checking direction X;
- block 39—updating of some parameters (T0←T; D←D/FR);
- block 40—comparison between the inspection position PN of the beam 7 in the checking direction X at the end of the search phase and a corresponding position defined in a calibration phase;

block 41—end of the checking cycle.

The checking of the position of the working area 11 of the tool 2 along the direction X by following the procedure of FIG. 4, that represents a possible embodiment of a method according to the present invention, occurs in the following way.

At first (block 19), depending on the values of the approximate nominal dimensions of the tool 2 and on the known arrangement of the tool 2 in the turret 3 with respect to the reference system of the machine tool, the first linear interval X1 and the second linear interval Z1, that locate the checking area 13 within which the checking displacements between tool 2 and beam 7 are limited, are defined.

Then a preliminary verification phase follows for verifying whether the set linear intervals (X1 and Z1) enable the correct performing of the checking. In order to do this, the tool 2 and the beam 7 are displaced with respect to each other (block 20) in order to bring the latter to a vertex 14 of the rectangle that delimits the area 13. If the interruption of the beam 7 (block 21) at the vertex 14 is observed, it means that the checking area 13 has not been correctly selected. As a consequence, the preliminary phase is interrupted, displacements of the tool 2 are controlled for bringing the beam 7 to a position definitely at the exterior of the area 13, and fresh linear intervals X1 and Z1 (block 22) are set. If the interruption of the beam 7 is not observed, mutual linear displacements (block 23) are controlled in sequence for bringing the beam 7 from a vertex (14,15,16) towards the subsequent one (15,16,17) along the sides of the rectangle that delimits the area 13. At every displacement it is verified whether the subsequent vertex has been reached (block 24). The preliminary phase is interrupted and the limits of the checking area 13 are reset (block 22) whenever there occur anomalies. The anomalies are signalled by interruptions of the beam 7 in the course of the displacements towards the vertexes 15 and 16 (blocks 25 and 27) or, in the last foreseen displacement—i.e. an inspection movement in the direction Z starting from the vertex 16—by the non-interruption of the beam 7 and the reaching of the vertex 17 (blocks 24 and 26). The verification preliminary phase otherwise positively ends when the beam 7 is correctly interrupted in the course of the inspection movement that starts from the vertex 16 (block 27).

Then the initial or absolute values of some parameters utilized in the subsequent actual checking phase are set (block 28). The parameters are hereinafter briefly described.

T0: it indicates the result of the immediately previous inspection with respect to the in-progress one, i.e. it indicates whether, in the course of the previous inspection movement between tool 2 and beam 7 (the following explanation refers) the interruption of the latter occurred (T0=1) or did not occur (T0=0). At first, T0 is set, for example, at value 1, also on the basis of the conclusion of the verification phase.

V: it indicates the sense of the next mutual displacement between tool 2 and beam 7 (the following explanation refers) insofar as the component in the checking direction X is concerned. With reference to FIG. 3, V=1 and V=0 indicate, for example, displacements to the right and to the left, respectively. At first V is set, for example, at value 1.

D: it is the amount of the displacement along the direction X to which V refers. At first D is set, for example, at a value that corresponds to the length of interval X1 reduced by the reduction factor FR (hereinafter described).

FR: it is the reduction factor relating to each displacement in direction X that follows in the checking sequence. In general, it is a fixed value. In the herein described example FR=2, i.e. the amount of the displacement along X is halved every time with respect to the previous displacement along the same direction X.

The search phase of the position of the working area 11 of the tool 2 foresees a sequence of checking displacements between tool 2 and beam 7 starting from the position taken at the end of the preliminary phase in which the beam 7 is at a point on the side defined by vertexes 16 and 17 that delimits the first linear interval X1. It should be realized that, in the present description, the search phase is distinguished from the preliminary phase described above with reference to the blocks 20-27 for more clearly describing a method according to the invention. The search phase actually follows the preliminary phase with substantial continuity.

A displacement (block 29) between the tool 2 and the beam 7 towards a determined mutual position is controlled so that the beam 7 displaces to a determined inspection position Pi on the lower side (with reference to the arrangement shown in FIG. 3) of the checking area 13, at a distance along axis X determined on the basis of the parameters V and D. More specifically, the sense V and the amount D of the first displacement in direction X with respect to the vertex 16 are those previously set (V=1; D=X1/FR=X1/2).

At inspection position Pi in the interval X1, a linear inspection movement is controlled (block 30) along direction Z and it interrupts when one of the two following events occurs (i) the reaching of the opposite side of the checking area 13 when the beam 7 has travelled, in the linear movement, the entire interval Z1 (block 31); or (ii) the interruption of the beam 7 signalled by the optoelectronic apparatus 1 (block 32). The event regarding the occurred interruption (T=1, block 34) or non-interruption (T=0, block 33) of the beam 7 is compared (block 35) with the corresponding event that occurred in the immediately previous inspection, indicated by the parameter T0 and, depending on whether the event has or has not repeatedly occurred, the sense in which the subsequent displacement along direction X will occur is held (V←V, block 36) or reversed (V←invV, block 38), respectively.

The values of some parameters are updated (T0←T, D←D/FR=T1/4, block 39) and the checking sequence is repeated starting from a fresh displacement (block 29) between tool 2 and beam 7 towards a fresh determined mutual position, in such a way that the beam 7 displaces to a fresh inspection position Pi at the lower side of the checking area 13, at a distance from the previous inspection position set on the basis of the values of parameters V and D. A fresh linear inspection movement (block 30) along direction Z is controlled at the fresh inspection position Pi in the interval X1.

The sequence of checking displacements ends when, after having verified that T≠T0 (block 35), the distance D between the current position and a previous one of the beam 7 in the interval X1, more specifically the immediately previous position, is less than the prefixed tolerance value W (block 37).

The final inspection position PN taken by the light beam 7 in the linear interval X1 at the end of the sequence of checking displacements is compared with the corresponding position detected in a previous calibration phase on a master piece for determining the position of the working area 11 of the tool 2 to be checked (block 41). Calibration is performed in a known way for correlating the absolute position of the machine axes of the lathe 4 with the one of the area 11 to be checked in a suitable reference system. If the position of the master piece with respect to the machine axes is known, a possible calibration procedure, herein not detailedly described for the sake of simplicity, can be performed on the master piece in a substantially identical way with respect to the one described with reference to the blocks 19-39 of the diagram shown in FIG. 4.

Then, from the position of the working area 11 and by knowing, as formerly mentioned, the arrangement of the tool 2 in the turret 3 with respect to the reference system of the machine tool, the dimensions of the tool 2 in the checking direction X can be determined.

Figure 5:
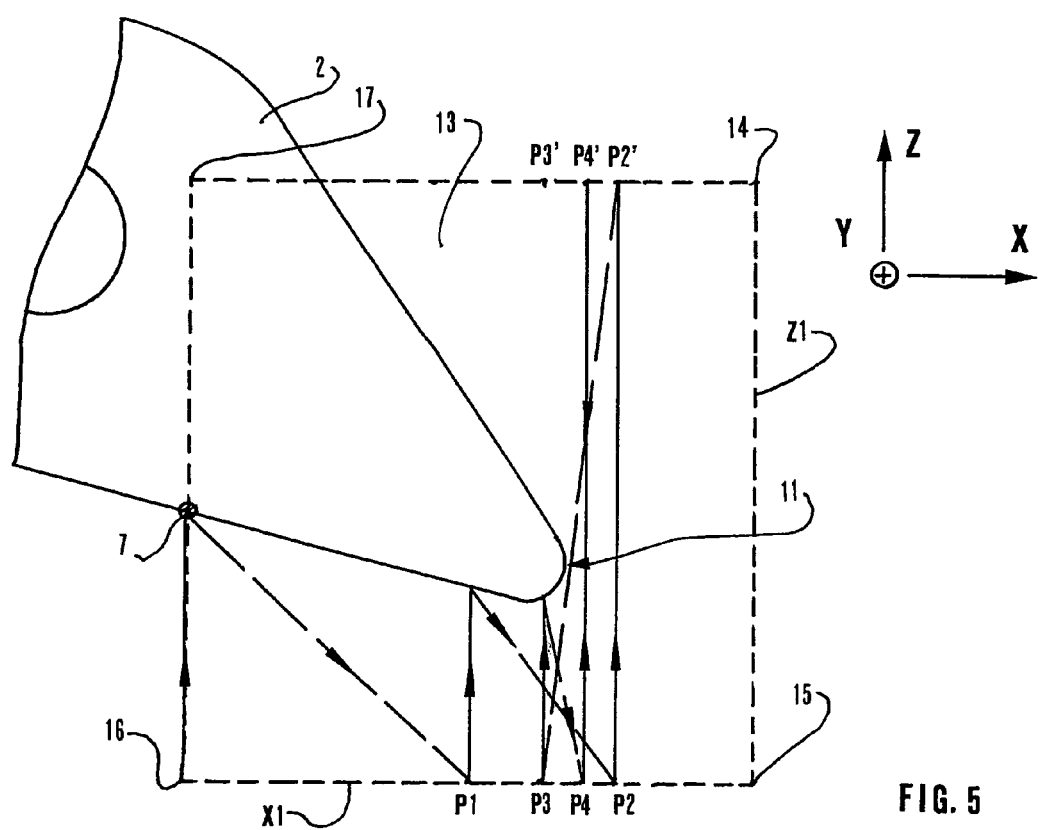
FIG. 5 is a furtherly enlarged and partial view of the tool shown in FIG. 3, including a graphical representation of a sequence of displacements in a checking method according to the invention.

In FIG. 5 the checking area 13 is furtherly enlarged and there are shown the linear inspection movements along direction Z (as uninterrupted lines) and the displacements with component in direction X (as dashed lines). In the example illustrated in FIG. 5, it is presumed that the tolerance value W is equal to a tenth of the amplitude of the interval X1 (X1/10). This value has been chosen just for the sake of simplifying the explanation of the cycle, and is definitely greater than an actual tolerance value. Furthermore, also for the sake of simplifying the explanation, movements of the light beam 7 in the checking area 13 are reported, while in the real applications the beam 7 is generally stationary with respect to the bed of the machine tool 4 (FIG. 2) and the turret 3 carrying the tool 2 (to which the area 13 is associated) performs movements in the plane X-Z. This corresponds to the substance of the method that includes, according to the invention, mutual movements between tool 2 and beam 7.

With reference to FIG. 5 and to the orientation therein shown, at the end of the preliminary phase for the verification of the checking area 13 (blocks 25 and 27), the beam 7 interferes with the tool 2 at the side between the vertexes 16 and 17 that delimits the linear interval X1. The beam 7 is brought back to the lower side of the checking area 13 displaced to the right with respect to the vertex 16 (V=1, block 28) of the amount D=X1/2 up to inspection position P1 (block 29) where an upward inspection movement in the direction Z is controlled (block 30). Since the interruption of the beam 7 is detected again, a fresh downward and, in the interval X1, rightward displacement of an amount halved with respect to the previous one (D=X1/4) takes place, up to inspection position P2. The subsequent inspection movement at P2 causes a different event, i.e. the reaching of a point P2' at the opposite end of the interval Z1, on the upper side of the checking area 13 (blocks 31, 33). As T(=0)≠T0 (=1) (block 35), the sense of the displacement along X is reversed (V←invV=0, block 38) and the beam 7 is brought back to the lower side of the checking area 13 displaced to the left with respect to P2 of the amount D=(X1/4)/2=X1/8 up to inspection position P3. At the subsequent inspection movement at P3, the event changes again (interruption of the beam 7) and thus the sense V of the subsequent displacement changes again (V←invV=1, block 38) on the lower side of the area 13 and to the right, up to inspection position P4 that is distant from P3 in the checking direction X of the amount D=(X1/8)/2=X1/16. A fresh inspection movement ends when the beam 7 reaches the upper side of the checking area 13, at a point P4' (blocks 31, 33). As T≠T0 (block 35) and D<W (X1/16<X1/10, block 37), the sequence of checking displacements ends, and the position of the working area 11 is determined (block 41) on the basis of the final inspection position PN=P4 in the linear interval X1.

The illustrated example clearly shows how the position of the working area 11 is found by means of a limited number of scans in the transversal inspection direction Z at inspection positions along the checking direction X at distances D progressively decreasing with respect to each other in a sequence that converges to the searched position. As already mentioned in the example illustrated with reference to FIG. 5, the tolerance value W has been chosen of a different order of magnitude with respect to what is normally requested and the displacements along the checking direction X, required for completing the checking cycle, are limited to four. In any case the example clearly demonstrates how rapidly the sequence of inspection positions Pi along the checking direction X converges to the searched position PN. In a real example, where the interval X1 is of a few millimeters and the tolerance value W is of a few microns, the necessary inspection movements are generally equal to or slightly greater than ten.

The described procedure represents just an example of a checking method according to the invention that foresees many possible variants. For example, the sequence of checking displacements can start from a mutual position that differs from the one described (that is determined in the preliminary verification phase), in case that, for example, the verification phase is unnecessary or is performed at a different moment in time. Moreover, the sequence of checking displacements can be stopped on the basis of the result of a different test, for example the comparison of the set tolerance W not with the distance D between the last two consecutive inspection positions Pi at which there have occurred opposite events, but with the distance between the current inspection position Pi and the last inspection position Pi at which there occurred the event opposite to the current one, regardless of the comparison between the events relating to the last two consecutive inspection positions Pi.

Other variants can regard the implementation of the displacements. Just as an example, three possible aspects that differ with respect to what has been herein so far described and illustrated are cited.

A reduction factor FR different from 2 can be chosen, for example it can be 3, or can assume a value that varies in the course of the checking cycle, for keeping into account the sequence of the events that have taken place. However, the reduction factor FR is chosen in such a way that the succession of the inspection positions Pi on the checking direction X converges to the position of the working area the position thereof has to be checked.

The inspection positions Pi in the interval X1 can be in the upper side (according to the arrangement shown in the figures) of the checking area 13, or alternatively in the lower side and in the upper one. This latter solution can be advantageously applied, for example, further to the occurring of the event according to which the interruption of the beam 7 is not detected. In this case, in the example of FIG. 5, the beam 7 is displaced from point P2' to a closer point P3' on the upper side of the area 13 that corresponds, in the interval X1, to the inspection position P3, whereas the subsequent linear inspection movement in the direction Z (block 30) occurs, as a consequence, downwards.

The displacements that follow the inspection movements occur, in the example shown in FIG. 5, with interpolated movements that include components along both directions X and Z ("saw-toothed movements"). Obviously this is not the only possible solution and the displacements can occur in two distinct phases (for example: return to the side of the checking area by a movement along Z, followed by a linear movement along X to the inspection position Pi).

As previously described, the description and the figures refer to the checking of the position along the axis X. By following an identical procedure, it is possible to check positions of working areas along the direction Z (area 12 in FIG. 3) or along other transversal directions of the plane X-Z.

This is particularly advantageous as it enables to carry out a complete verification of the cutting edges of the tools for checking associated points, or working areas, oriented in different directions. In the example shown in simplified form in FIG. 3, both the working areas 11 and 12 can be, for example, simply and rapidly checked in sequence.

A method according to the invention enables the checking of different types of tools in different applications, and in general mechanical parts of various type (for example, workpieces before or after the machining).

The invention claimed is:

1. A method for checking the position of a mechanical part along at least one checking direction by means of an apparatus including a device for generating a light beam along a trajectory transverse to said at least one checking direction, a sensor for detecting the interruption of the light beam, and devices for causing relative displacements between the mechanical part and the light beam along said at least one checking direction and along an inspection direction transverse to the at least one checking direction, the method comprising:
   identifying a first linear interval and a second linear interval related to relative positions between the mechanical part and the light beam along the at least one checking direction and the inspection direction, respectively, said first linear interval and said second linear interval defining a checking area of the mechanical part;
   controlling a sequence of checking displacements between the mechanical part and the light beam, including:
      controlling displacements for bringing the light beam to inspection positions along the first linear interval; and
      controlling linear inspection movements at said inspection positions along said inspection direction;
   detecting the interruption or the non-interruption of the light beam in the course of said linear inspection movements along the inspection direction, and consequently selecting a subsequent of said inspection positions along the first linear interval at which subsequent linear inspection movements are controlled;
   stopping the sequence of checking displacements at a final inspection position of the light beam along the first linear interval, wherein said final inspection position lies at a distance less than a preset value from a previous inspection position, and wherein in the course of linear inspection movements at said final inspection position and said previous inspection position in the first linear interval, there have been detected the interruption and the non-interruption of the light beam, respectively, or vice versa; and
   identifying the position of the mechanical part along the at least one checking direction on the basis of said final inspection position.

2. The method according to claim 1, wherein said inspection positions along the first linear interval are selected at distances progressively decreasing from each other according to a convergent sequence.

3. The method according to claim 2, wherein said inspection positions along the first linear interval are selected at distances progressively halved from each other.

4. The method according to claim 2, wherein said displacements for bringing the light beam to inspection positions along the first linear interval are controlled in a first orientation or in a second, opposite orientation along said at least one checking direction as a consequence of the detecting of the interruption or the non-interruption of the light beam in the course of the linear inspection movements at two most recent inspection positions.

5. The method according to claim 1, including a preliminary verification phase of said checking area with displacements between the light beam and the mechanical part between predetermined points of the checking area.

6. The method according to claim 5, wherein said preliminary verification phase includes at least one of said linear inspection movements along the inspection direction.

7. The method according to claim 1, wherein said linear inspection movements along said inspection direction are interrupted as soon as the interruption of the light beam is detected.

8. The method according to claim 1, wherein trajectory of said light beam and said checking area are substantially perpendicular.

9. The method according to claim 1, wherein in the step of stopping the sequence of the checking displacements, said previous inspection position is the immediately preceding position with respect to the final inspection position.

10. The method according to claim 1, wherein said light beam is a laser beam.

11. The method according to claim 1, for checking the position of a working area of a tool coupled to a turret of a machine tool.

12. A method for checking the position of a mechanical part along one checking direction by means of an apparatus including a device for generating a light beam along a trajectory transverse to said checking direction, a sensor for detecting the interruption of the light beam, and devices for causing relative displacements between the mechanical part and the light beam along said checking direction and along an inspection direction transverse to said checking direction, the method comprising:
   identifying a first linear interval and a second linear interval related to relative positions between the mechanical part and the light beam along the checking direction and the inspection direction, respectively, said first linear interval and said second linear interval defining a checking area of the mechanical part;
   controlling a sequence of checking displacements between the mechanical part and the light beam, the sequence comprising:
      (a) a linear inspection movement along said inspection direction within the checking area, till there occurs one of the following events:
         (i) interruption of the light beam; and
         (ii) relative displacement along the entire second linear interval with no interruptions of the light beam;
      (b) a displacement along the checking direction, in a determined first orientation, up to an inspection position of the light beam in said first linear interval;
      (c) repetition of the linear inspection movement along the inspection direction according to step (a);

(d) a new displacement along the checking direction in the first orientation, or in a second, opposite orientation, the orientation being determined according to whether event (i) or (ii) that occurred in the most recent linear inspection movement was the same as that occurred in the previous linear inspection movement, said new displacement extending up to a new inspection position of the light beam along said first linear interval, at a known distance with respect to the immediately previous inspection position;

(e) repetition of movements and displacements, according to steps (c) and (d)—with progressively decreasing distances between new inspection positions and the immediately previous inspection positions of the light beam in said first linear interval—till the distance between inspection position and a previous inspection position is less than a prefixed value; and identifying the position of the mechanical part along the checking direction on the basis of the new inspection position of the light beam in said first linear interval at the end of the sequence of checking displacements.

13. A system for checking the position of a working area of a tool, coupled to a turret of a machine tool, along at least one checking direction, comprising:

a device for generating a light beam along a trajectory transverse to said at least one checking direction;

a sensor for detecting interruption of the light beam;

devices for causing relative displacements between the tool and the light beam along said at least one checking direction and along an inspection direction transverse to the at least one checking direction; and a control unit that is adapted to perform the following steps:

controlling a sequence of checking displacements between said tool and said light beam, including displacements for bringing the light beam to inspection positions along said at least one checking direction, and, at said inspection positions, linear inspection movements along said inspection direction;

detecting the interruption or the non-interruption of the light beam in the course of said linear inspection movements along the inspection direction, and consequently selecting a subsequent inspection position at which a subsequent linear inspection movement is performed;

stopping the sequence of checking displacements at a final inspection position of the light beam along said at least one checking direction that lies at a distance less than a preset value from a previous inspection position, where, in the course of linear inspection movements at said final inspection position and said previous inspection position, there have been detected he interruption and the non-interruption of the light beam, respectively, or vice versa, and identifying the position of the tool along the checking direction on the basis of said final inspection position.

* * * * *